June 20, 1950
W. E. PAKALA
2,512,372
CONTROL APPARATUS RESPONSIVE
TO POSITIONAL CHANGES
Filed March 13, 1948
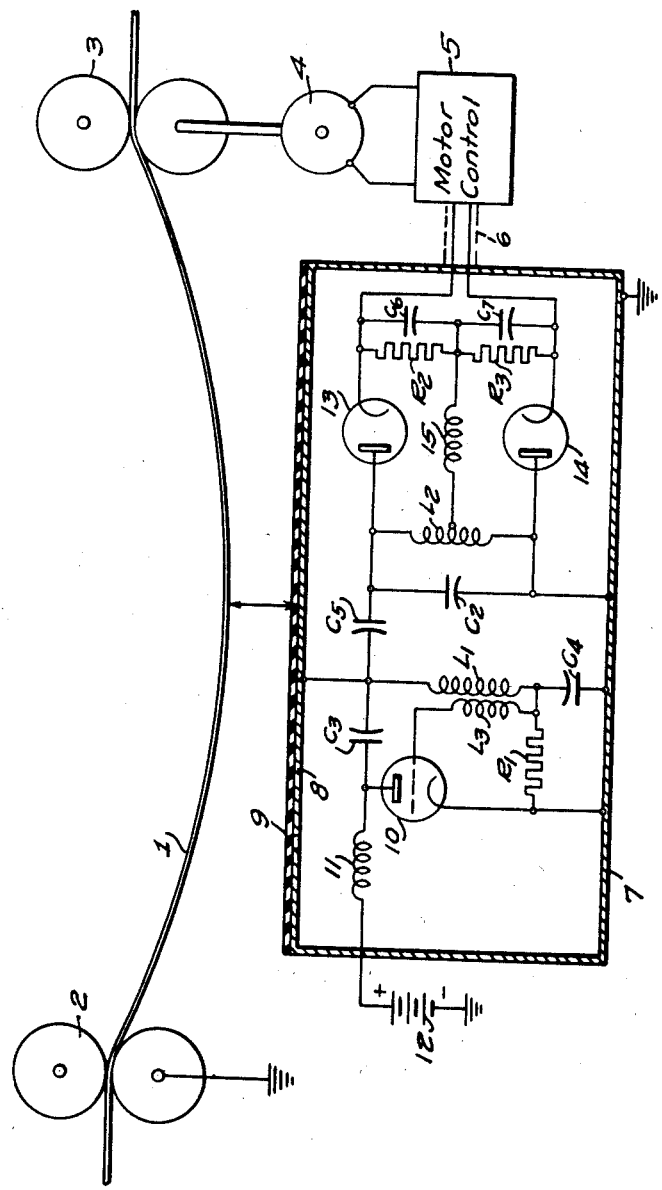
WITNESSES:
E. A. McCloskey
Wm. C. Groome
INVENTOR
William E. Pakala.
BY C. M. Avery
ATTORNEY Patented June 20, 1950

2,512,372

UNITED STATES PATENT OFFICE 2,512,372

CONTROL APPARATUS RESPONSIVE TO POSITIONAL CHANGES

William E. Pakala, Pittsburgh, Pa., assignor to Westinghouse Electric Corporation, East Pittsburgh, Pa., a corporation of Pennsylvania Application March 13, 1948, Serial No. 14,776

9 Claims. (Cl. 318—306)

My invention relates to control apparatus responsive to positional changes of material, and especially to apparatus for regulating or correcting the travel of products during manufacturing, fabricating or conveying.

Known apparatus of this general type are equipped with electric contacts to be engaged by the travelling products. Such contacts are difficult to apply for many purposes and may become unreliable or inoperative due to dirt or dust.

Photoelectric control equipment is sometimes difficult to apply because it requires installations on both sides of the travelling objects, and such equipment is subject to failure due to inadvertent obstruction of the beam of light.

It is an object of my invention to provide control apparatus capable of performing the desired control functions of the known controls but free of their above-mentioned deficiencies. More in particular, the invention aims at devising control apparatus that operate reliably under conditions where a direct contact with the travelling material or product is not desired, that are not appreciably affected by dust or dirt, not put out of commission by opaque obstructions, and that can be built as a compact unit of relatively small overall dimensions.

According to my invention, I provide the control apparatus with capacitance-controlled electronic circuit means for providing a variable control voltage, and I utilize the variations in capacitance between a stationary insulated conductor and the travelling product as the voltage-controlling stimulus for regulating or correcting the travelling motion of the product.

According to another feature of the invention, I dispose the electronic devices and circuits of the control apparatus in a protective housing so designed that the above-mentioned stationary conductor forms part of the housing, for instance, one of its walls or a portion thereof.

These and other features of the invention will be apparatus from the embodiment schematically shown in the drawing by way of example.

According to the drawing, a strip of conductive material 1 travels between pinch rolls 2 and 3 and is grounded, for instance, through the rolls. A variable speed motor 4 serves to drive roll 3 and is connected to control equipment 5 which, in response to a variable control voltage, regulates the speed of motor 4 so as to maintain the slack portion of the material 1 substantially within given limit positions.

Details of the control equipment 5 are not illustrated because any of the various available and well known types of control systems may be used, such as an electronic system or a Ward-Leonard type system, for instance.

The control equipment 5 controls the speed of motor 4 in accordance with a direct-current voltage which is applied through a shielded cable 6 and controlled by an electronic pilot apparatus enclosed in a metallic housing 7. One wall of this housing is partially formed by a metal plate 8 which is insulated from the rest of the housing structure and covered by insulating material 9. The material 9 may consist of an insulating rigid cover or wall plate and may also serve to hold and fasten the member 8 in proper position.

An oscillator triode 10 has its cathode connected to the grounded housing 7, while the anode is connected through an inductance coil 11 to the positive pole of a suitable source of direct current, here schematically shown as a battery 12. The grid circuit of triode 10 includes a bias resistor $R_1$ and a grid coil $L_3$ coupled with an oscillator coil $L_1$. The oscillator section also includes a blocking capacitor $C_3$ (.01 to .001 mfd., depending upon the average oscillator frequency) and a by-pass capacitor $C_4$ (.1 mfd.). Oscillator coil $L_1$ and resistor $R_1$ are series-connected between plate 8 and housing 7. Capacitor $C_4$ lies in parallel to resistor $R_1$. A fixed oscillatory circuit, composed of a capacitor $C_2$ and an inductance coil $L_2$, is connected to the oscillator and forms the input section of a full-wave rectifier with tubes 13, 14, a load coil 15, and two load resistors $R_2$, $R_3$ (each 50,000 to 100,000 ohms) shunted by by-pass capacitors $C_6$, $C_7$ (.001 to .0001 mfd., each). The rectified voltage is applied through cable 6 to the control unit 5. It will be understood that the numerical values given in parentheses in this specification are presented for the purpose of exemplifying orders of magnitude and may be modified in accordance with particular requirements or desiderata.

The plate 8 and the grounded metal strip 1 form together a capacitor which is connected in parallel to the oscillator coil $L_1$. As the metal strip 1 changes its distance from plate 8, the frequency generated by the oscillator tube circuit varies, thus causing a reduction or increase in the voltage across the fixed oscillator circuit $L_2$—$C_2$. As a result, the magnitude of the rectified output voltage impressed on the motor control equipment 5 varies accordingly.

The total capacity in the oscillator circuit is the sum of a fixed capacity ($C_a$), represented by the capacity of plate 8 to ground, and a variable capacity ($C_x$), represented by the capacity between plate 8 and strip 1. The design may be such that the two capacities are about equal. Their sum, and, therefore, the size of plate 8, depend in the usual manner on the frequency chosen for the oscillator. For instance, at 1 megacycle per second, $C_a + C_z = .0001$ mfd.

Apparatus according to the invention are applicable in most cases where heretofore photocells or direct contact means have been used and offer the advantages of minimum space requirements, increased safety from failure due to blocking-off or obstruction, and high stability of operation because the sensitivity is not affected by dirt or dust.

The invention permits various changes and modifications especially as regards the circuits and components of the position-responsive device. For instance, instead of connecting the plate 8 to the oscillator coil $L_1$, a fixed parallel capacitor may be connected across coil $L_1$; while, instead of using the fixed capacitor $C_2$, the coil $L_2$ is connected to plate 8. Then the oscillator frequency remains fixed, or nearly fixed, and the rectified output voltage changes because the tuning of the $L_2$ circuit is changed. This modification (not illustrated because it is otherwise similar to the one illustrated and operates in a basically similar manner) will suffice to show that apparatus according to the invention can be altered and modified without departing from the essence, objects and principles of the invention and within the scope of the features of the invention as set forth in the claims annexed hereto.

I claim as my invention:

1. Apparatus for controlling the travel of conductive material, comprising means for driving the material, means grounding said material, electronic circuit means connected to said drive means to provide variable voltage for controlling said drive means, and variable-capacitance means forming part of said circuit means for controlling said voltage and having an insulated conductive body disposed to form together with the material two opposite plate-sides of a distinct capacitor whose capacitance varies in dependence upon the separation-distance between said material plate-side and said body plate-side.

2. Apparatus for controlling the travel of conductive material, comprising means for driving the material, means grounding said material, an electronic device including an oscillator to provide alternating voltage and a rectifier to rectify said voltage and a resonance circuit having inductance means and capacitance means for controlling said voltage, said rectifier being connected to said drive means for controlling said drive means by rectified voltage, and said capacitance means having an insulated conductive body disposed to form together with the material two opposite plate-sides of a distinct capacitor whose capacitance varies in dependence upon the separation-distance between said material plate-side and said body plate-side.

3. Apparatus for controlling the travel of conductive material, comprising means for driving the material, means grounding said material, an electronic oscillator of variable frequency having variable capacitance means for controlling said frequency and being connected to said drive means for controlling said drive means in dependence upon said frequency, said capacitance means having an insulated conductive body disposed to form together with the material two opposite plate-sides of a distinct capacitor whose capacitance varies in dependence upon the separation-distance between said material plate-side and said body plate-side.

4. Apparatus for controlling the travel of conductive material, comprising means for driving the material, means grounding said material, an electronic oscillator of variable frequency having variable capacitance means for controlling said frequency, said capacitance means having a conductive body disposed to form together with the material two opposite plate-sides of a distinct capacitor whose capacitance varies in dependence upon the separation-distance between said material plate-side and said body plate-side, and rectifying means connected between said oscillator and said drive means for controlling said drive means by rectified voltage dependent upon said frequency.

5. Apparatus for providing variable voltage in response to positional changes of conductive material, comprising a housing structure having a conductive portion to be ground-connected with the material and having a conductive plate insulated from said portion in order to form together with the material a capacitor whose capacitance varies in dependence upon positional changes of the material relative to said plate, and electronic circuit means disposed in said housing structure for providing variable output voltage, said plate and said portion forming part of said circuit means for controlling said voltage in dependence upon said capacitance.

6. Apparatus for providing variable voltage in response to positional changes of conductive material, comprising a housing structure having a conductive portion to be ground-connected with the material and having a conductive plate insulated from said portion in order to form together with the material a capacitor whose capacitance varies in dependence upon positional changes of the material relative to said plate, an electronic oscillator disposed in said housing structure and being connected to said portion and to said plate to be frequency controlled in dependence upon said capacitance, and rectifying means disposed in said housing structure and connected to said oscillator to provide rectified output voltage dependent upon the oscillator frequency.

7. Apparatus for providing variable voltage in response to positional changes of conductive material, comprising a housing structure having a conductive portion to be ground-connected with the material and having a conductive plate insulated from said portion in order to form together with the material a capacitor whose capacitance varies in dependence upon positional changes of the material relative to said plate, an electronic oscillator disposed in said housing and having an oscillatory control circuit, a rectifier disposed in said housing to provide rectified output voltage, and an oscillatory coupling circuit connecting said rectifier with said oscillator, one of said oscillatory circuits being connected to said portion and to said plate so as to vary its frequency tuning in dependence upon said variable capacitance for controlling said output voltage.

8. Apparatus for controlling the travel of conductive material, comprising means for driving the material, said means comprising horizontally-spaced roll means providing a stretch of material therebetween which is of a variable length, electronic circuit means connected to said drive means to provide a variable voltage for controlling said driving means, and variable capacitance means forming part of said circuit means for controlling said voltage and having an insulated conductive body vertically spaced from said stretch of material to form a capacitor therewith having a capacitance which varies in dependence upon length of said stretch of material between said spaced roll means.

9. An invention including that defined in claim 8 but further characterized by said electronic circuit means comprising an oscillator to provide alternating voltage, a rectifier to rectify said voltage, and a resonance circuit having inductance means and said capacitance means for controlling said voltage, said rectifier being connected to said drive means for controlling said drive means by rectified voltage.

WILLIAM E. PAKALA.

REFERENCES CITED

The following references are of record in the file of this patent:

UNITED STATES PATENTS

| Number | Name | Date |
|---|---|---|
| 1,708,074 | Allen | Apr. 9, 1929 |
| 1,977,619 | Boyer et al. | Oct. 23, 1934 |
| 2,146,869 | White | Feb. 14, 1939 |
| 2,165,510 | Rosene | July 11, 1939 |